United States Patent [19]

Seki et al.

[11] Patent Number: 4,864,209

[45] Date of Patent: Sep. 5, 1989

[54] NEGATIVE FEEDBACK CONTROL SYSTEM

[75] Inventors: Shinji Seki, Kokubunji; Shunsuke Matsubara, Hino, both of Japan

[73] Assignee: Fanuc Ltd., Yamanashi, Japan

[21] Appl. No.: 233,647

[22] PCT Filed: Oct. 29, 1987

[86] PCT No.: PCT/JP87/00830

§ 371 Date: Jun. 22, 1988

§ 102(e) Date: Jun. 22, 1988

[87] PCT Pub. No.: WO88/03282

PCT Pub. Date: May 5, 1988

[30] Foreign Application Priority Data

Oct. 29, 1986 [JP] Japan .................. 61-255748

[51] Int. Cl.⁴ .................................. G05B 1/01
[52] U.S. Cl. ........................... 318/611; 318/603; 318/608; 318/460
[58] Field of Search ............ 318/601–639, 318/594, 569, 114, 127, 128, 460, 649

[56] References Cited

U.S. PATENT DOCUMENTS 4,553,078 11/1985 Wise .................. 318/601 X
4,642,544 2/1987 Furumura et al. ........ 318/685 X
4,716,347 12/1987 Fujimoto .................. 318/460

*Primary Examiner*—William M. Shoop Jr.
*Assistant Examiner*—Paul Ip
*Attorney, Agent, or Firm*—Armstrong, Nikaido, Marmelstein, Kubovcik & Murray

[57] ABSTRACT

A negative feedback control system includes a step of amplifying digital information by an amplifying operation at a high response speed and not including an integration. The negative feedback control system detects a predetermined amount of increase and decrease in the controlled variable, and outputs an increment signal or a decrement signal according to the predetermined amount of increase and decrease in the controlled variable, respectively, receives increment signals and the decrement signals from a controlled variable detecting unit 4, ignores the first successive n increment signals immediately after an arbitrary decrement signal, then begins to count each increment signal as a +1 unit from the n+1—th increment signal after the arbitrary decrement signal, and ignores the first successive n decrement signals immediately after an arbitrary increment signal, then begins to count each decrement signal as a −1 unit from the n+1—th decrement signal after the arbitrary increment signal (FIG. 2); whereby the vibration of the controlled variable is suppressed.

2 Claims, 4 Drawing Sheets

NEGATIVE FEEDBACK CONTROL SYSTEM

TECHNICAL FIELD

The present invention relates to a negative feedback control system, more particularly, it relates to a negative feedback control system using digital signals.

BACKGROUND ART

The prior art provides digital feedback systems having a detecting means which outputs an increment signal or a decrement signal according to a predetermined amount of increase or decrease of a controlled variable, respectively, and having two kinds of feedback loops, along one of which feedback loops each increment signal is counted as +1 and each decrement signal is counted as −1, an aggregate of the count is compared with a target value of a controlled variable, a deviation from the target value is amplified in a low response speed amplifying means in which an amplifying operation at a low response speed and including an integration is carried out, and along the other of which feedback loops the count is directly amplified in the high response speed amplifying means in which an amplifying operation at a high response speed and not including an integration is carried out.

FIG. 1 shows a general construction of the conventional system as mentioned above.

In FIG. 1, a controlled variable detecting means 4 detects a predetermined amount of increase or decrease of a controlled variable, and outputs an increment signal or a decrement signal according to the predetermined amount of increase or decrease of a controlled variable, respectively; a simple counting means 5 counts each increment signal as +1 unit, and counts each decrement signal as −1 unit; a controlled variable target value command means 9 commands the target value of the controlled variable; a first deviation detecting means 6 detects deviation of the output of the simple counting means 5 from the target value; a high speed feedback amplifying means 2 amplifies the output of the simple counting means 5 by an amplifying operation at a high response speed and not including an integration; a low speed amplifying means 7 amplifies the output of the first deviation detecting means 6 by an amplifying operation at a low response speed and including an integration; a second deviation detecting means 8 detects the deviation of the output of the high speed feedback amplifying means 2 from the output of the low speed amplifying means 7; and a controlled variable varying means 3 increases or decreases the controlled variable according to the output of the second deviation detecting means 8.

In the construction of FIG.1, the output of the simple counting means 5 is amplified at a high speed in the high speed feedback amplifying means 2, and applied to the second deviation detecting means 8 as a feedback. If the deviation detected in the second deviation detecting means 8 is positive, the controlled variable varying means 3 operates to decrease the controlled variable, and thus the controlled variable is decreased. When the decrease of the controlled variable amounts to n units, the controlled variable detecting means 4 detects the change of −n units in the controlled variable, and the outputs n decrement signals. The simple counting means 5 counts the n decrement signals, and the output of the simple counting means 5 is amplified in the high speed feedback amplifying means 2 and applied to the second deviation detecting means 8. If the deviation detected in the second deviation detecting means 8 as a result of the change of −n units in the controlled variable is also negative, the controlled variable detecting means 4 operates to increase the controlled variable. Accordingly, the controlled variable is again increased, and the system detects the increase and twice attempts to decrease the controlled variable again.

As mentioned above, when the friction force operating against the change of the controlled variable is small, even if the system attempts to stop the controlled variable at a constant value, the controlled variable is repeatedly increased and decreased (vibrated) at the characteristic frequency in an unlimited manner.

In this case, only the loop which includes the high speed feedback amplifying means 2 has an influence on the vibration as described above, the signals from the loop which includes the low speed amplifying means 7, the operation of which includes an integration and the response of which is slow, has no influence on the above vibration.

For example, the phenomenon mentioned above occurs in the digital servo system of a motor, and small vibrations at the frequency of several tens to one hundred and several tens of Hz occur around the target value at which the controlled variable is commanded to stop.

DISCLOSURE OF THE INVENTION

The object of the present invention is to provide a negative feedback control system which suppresses the occurrence of vibration in a high speed negative feedback control using digital signals.

A negative feedback control system according to the present invention comprises: a controlled variable detecting means which detects a predetermined amount of increase and decrease in the controlled variable, and outputs an increment signal or a decrement signal according to the predetermined amount of increase and decrease in the controlled variable, respectively; a simple counting means which counts each increment signal as a +1 unit, and counts each decrement signal as a −1 unit; a vibration suppressing counting means which receives the increment signals and the decrement signals from the controlled variable detecting means, ignores the first successive n increment signals immediately after an arbitrary decrement signal and then begins to count each increment signal as a +1 unit from the n+1th increment signal after the arbitrary decrement signal, and which ignores the first successive n decrement signals immediately after an arbitrary increment signal, then begins to count each decrement signal as a −1 unit from the n+1th decrement signal after the arbitrary increment signal; a controlled variable target value command means which commands the target value of the controlled variable; a first deviation detecting means which detects deviation of the output of the simple counting means from the target value; a high speed feedback amplifying means which amplifies the output of the vibration suppressing counting means by an amplifying operation at a high response speed and not including an integration; a low speed amplifying means which amplifies the output of the first deviation detecting means by an amplifying operation at a low response speed and including an integration; a second deviation detecting means which detects the deviation of the output of the high speed feedback amplifying means from the output of the low speed amplifying means; and a controlled variable varying means which increases or decreases the controlled variable according to the output of the second deviation detecting means.

BEST MODE FOR CARRYING OUT THE INVENTION

Figure 1:
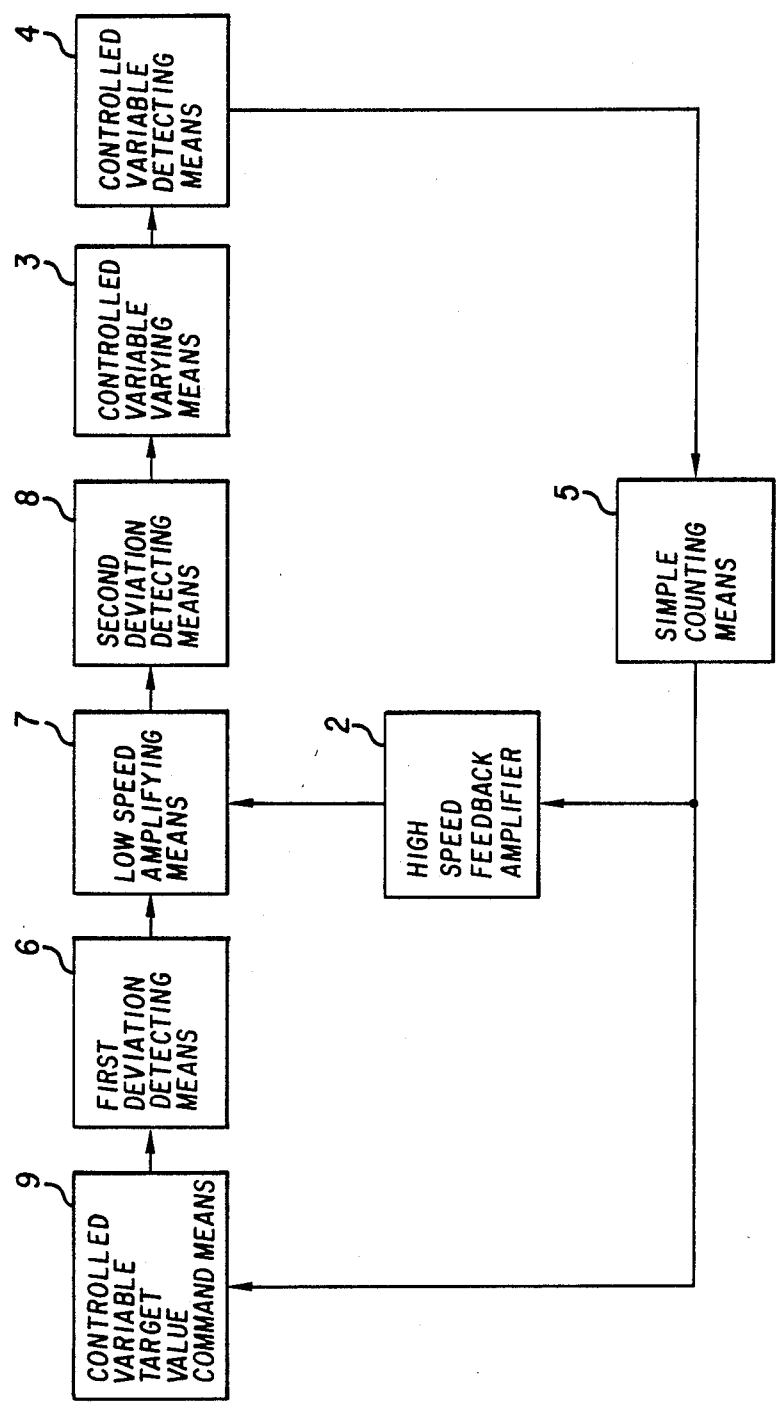
FIG. 1 shows a general construction of the conventional negative feedback control system.
Figure 2:
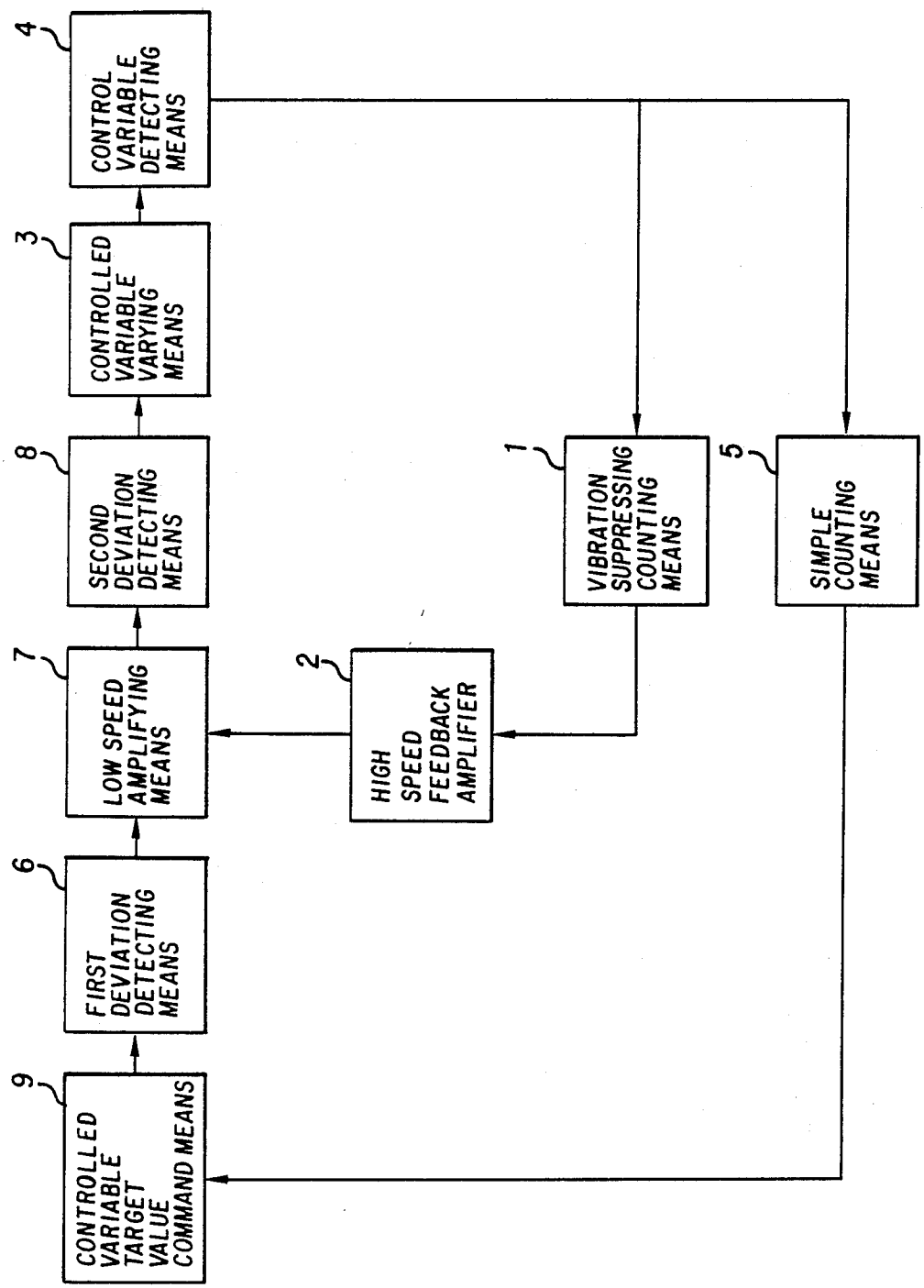
FIG. 2 shows a basic construction of the negative feedback control system according to the present invention.

FIG. 2 shows a basic construction of the present invention, and corresponds to the general construction of the conventional negative feedback control system shown in FIG.1. In the negative feedback control system according to the present invention, as shown in FIG.2, the output of the vibration suppressing counting means 1, instead of the output of the simple counting means 5, is applied to the high speed feedback amplifying means 2 in which an amplifying operation is carrying out at a high response speed and not including an integration. The vibration suppressing counting means 1 receives the increment signals and the decrement signals from the controlled variable detecting means 4, and ignores the first successive n increment signals immediately after an arbitrary decrement signal, then begins to count each increment signal as a +1 unit from the n+1th increment signal after the arbitrary decrement signal, and ignores the first successive n decrement signals immediately after an arbitrary increment signal, then begins to count each decrement signal as a −1 unit from the n+1th decrement signal after the arbitrary increment signal.

Accordingly, even if n or less of successive increment signals and n or less of successive decrement signals are output alternately, the vibration suppressing counting means 1 does not count these alternate successive signals, and no output in response to these alternate successive signals is transferred to the next stage, and therefore, the controlled variable varying means 3 does not operate in response to these alternate successive signals, and as a result, the occurrence of vibration is suppressed.

An embodiment of the present invention is described hereinafter.

Figure 3:
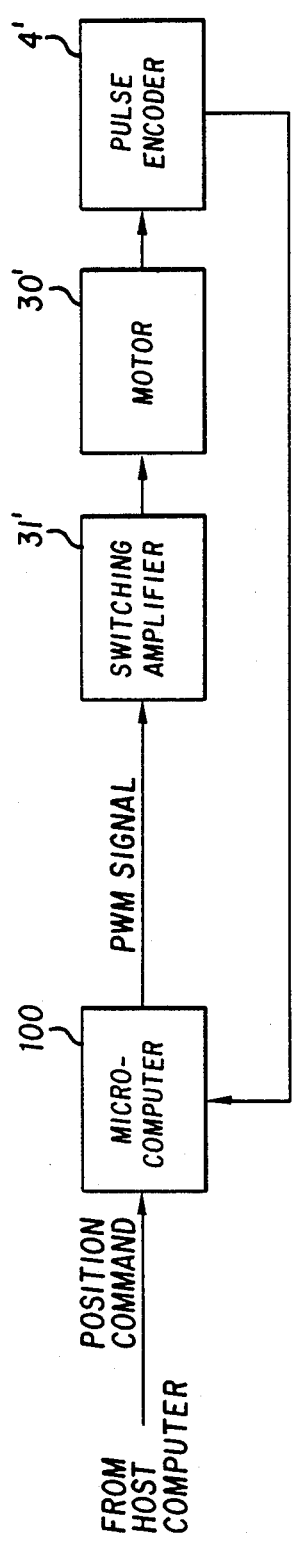
FIG. 3 shows a construction of the hardware of the servo system of a motor.

FIG. 3 shows a outline of a construction of the hardware of the servo system of the motor. The system of FIG.3 comprises a microcomputer 100, a switching amplifier 31, a motor 30, and a pulse encoder 4.

The switching amplifier 31 drives the motor 30. The position of rotation of the motor 30 is detected by the pulse encoder 4.

The output of the pulse encoder 4 consists of 2 signals, the phases of which signals are different by 90°, an A-phase signal and an B-phase signal. The state of each of the two signals changes from one state to the other of the "H" level and "L" level. The leading edges and falling edges correspond to the increment signals when the A-phase signal preceeds to the B-phase signal by 90°. The leading edges and falling edges correspond to the decrement signals when the B-phase signal preceeds to the A-phase signal by 90°.

The microcomputer 100 receives a position command for the position of rotation of the motor 30 from the host computer, and the microcomputer 100 recognizes the actual position of rotation and the rotation speed of the motor 30 by counting the increment signals and the decrement signals from the pulse encoder 4 and calculates the deviation of the actual position of rotation and the rotation speed of the motor 30 from the position command from the host computer. Further, the microcomputer 100 outputs a PWM signal according to the calculated deviation as a drive command to the switching amplifier 31, so that the actual position of rotation of the motor 30 is brought to that position by the position command.

Figure 4:
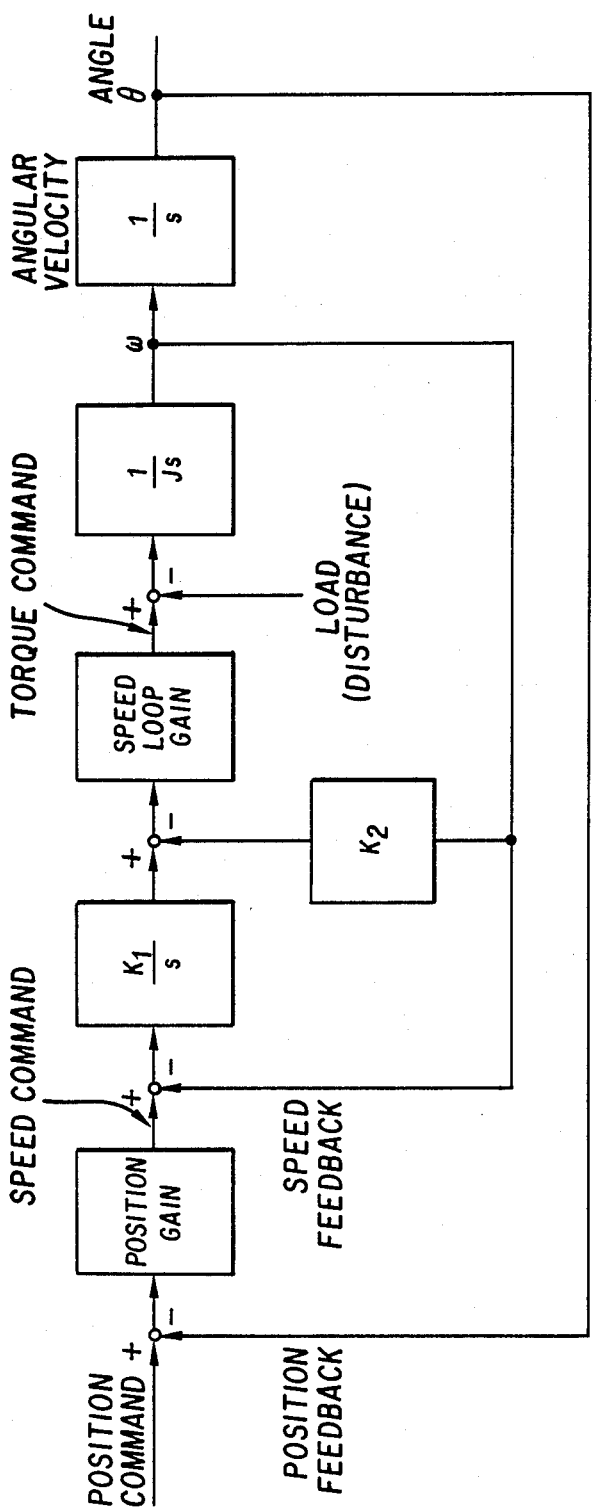
FIG. 4 is a block diagram of a conventional servo system of a motor.

FIG. 4 is a block diagram which shows the flows of control signals of a conventional servo system of the motor by using transfer functions, which system has the hardware construction shown in FIG. 3.

First, the first deviation is obtained as a difference between a position feedback signal and a position command, then the first deviation is amplified by a position gain $K_F$, and the amplified signal is output as a speed command. At the next stage, the second deviation is obtained as a difference between a speed feedback signal and the speed command, then the second deviation is amplified by a proportional plus integral operation shown by a transfer function $K_1/s$. On the other hand, a speed feedback signal is amplified by a gain $K_Z$. The third deviation is obtained as a difference between the speed feedback signal amplified by $K_Z$ and the second deviation amplified by $K_1/s$, is further amplified by a speed loop gain, and then is output as a torque command. The torque command value is reduced by loads to the motor system and by disturbances, and therefore, the remaining part of the torque command value after being reduced as above, contributes to the angular velocity of the motor $\omega$. The angular velocity of the motor $\omega$ corresponds to the speed feedback signal. The angle $\theta$, which is a time integration of the angular velocity of the motor $\omega$, corresponds to the position feedback signal.

According to the present invention, parts of the speed feedback signal in FIG.4 which cause vibrations of the motor, are removed (ignored) before being amplified linearly by a gain $K_z$. This operation is also carried out by the microcomputer 100.

Figure 5:
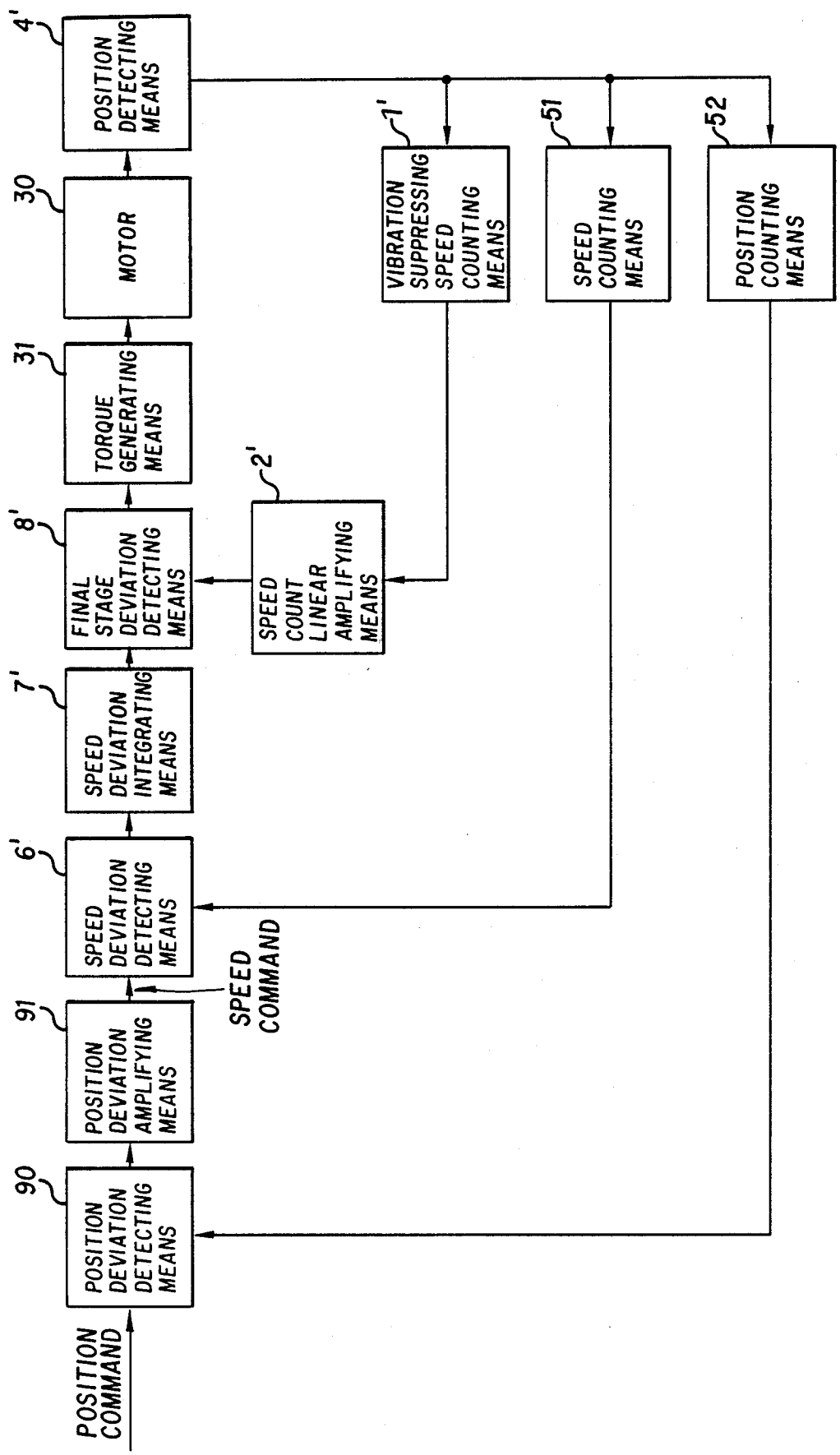
FIG. 5 shows a construction of the negative feedback control system in the servo system of the motor as an embodiment of the present invention.

FIG. 5 shows an operation by the microcomputer 100 when the present invention is applied to the servo system of the motor shown in FIGS. 3 and 4. All means in FIG. 5, except the motor 30, the position detecting means 4, which corresponds to the pulse encoder 4 in FIG.3, and the torque generating means 31 which corresponds to the switching amplifier 31, in FIG. 3, are realized by operations carried out by the microcomputer 100.

The position detecting means (pulse encoder) 4 detects a predetermined angle of increase and decrease in the position of rotation of the motor, and outputs an increment signal or an decrement signal corresponding to the predetermined angle of increase and decrease in the position of rotation of the motor, respectively. The position detecting means (pulse encoder) 4 corresponds to the controlled variable detecting means 4.

The speed counting means 51 receives the increment signals and the decrement signals, and counts each increment signal as +1, and counts each decrement signal as −1, for every predetermined duration.

The position counting means 52 also receives the increment signals and the decrement signals, and counts each increment signal as +1, and counts each decrement signal as −1, in the aggregate.

The speed counting means 51 and the position counting means 52 correspond to the simple counting means 5 in FIG. 2.

The position deviation detecting means 90 in FIG. 5 compares the output of the position counting means 52 with a position command from the host computer (not shown) to obtain the deviation of the output of the position counting means 52 from the position command. The position deviation amplifying means 91 amplifies the output of the position deviation detecting means 90 to be output as a speed command. The speed deviation detecting means 6 compares the output of the speed counting means 51 with the speed command to obtain the deviation of the output of the speed counting means 51 from the speed command.

The speed deviation detecting means 6' corresponds to the first deviation detecting means 6 in FIG. 2. In this embodiment, negative feedback control is carried out for two controlled variables, the speed and the position, therefore, the position deviation detecting means 90 in FIG. 5 also corresponds to the first deviation detecting means 6 in FIG. 2. But, from the point of view that the position deviation detecting means 90 and the position deviation amplifying means 91 in FIG. 5 output the speed command, they correspond to the controlled variable target value command means 9 in FIG. 2 with regards to the speed feedback control.

The speed deviation integrating means 7 amplifies the output of the speed deviation detecting means 6 with a low response speed and including an integration. This amplification corresponds to the operation $K_1/s$ in FIG. 4, and the speed deviation integrating means 7 corresponds to the low speed amplifying means 7 in FIG. 2.

The speed count linear amplifying means 2 multiplies a constant number to the output of the vibration suppressing speed counting means 1, and corresponds to the high speed feedback amplifying means 2 in FIG. 2. This operation corresponds to the operation $K_z$ in FIG. 4.

The final stage deviation detecting means 8 obtains the deviation of the output of the speed count linear amplifying means 2 from the output of the speed deviation integrating means 7, and corresponds to the second deviation detecting means 8 in FIG. 2. The torque generating means 31 supplies a drive current to the motor, so that the torque according to the output of the final stage deviation detecting means 8 is generated at the motor. The torque generating means 31 corresponds to the controlled variable varying means 3 in FIG. 3.

Although similar to the speed counting means 51, the vibration suppressing speed counting means 1 counts the increment signals and the decrement signals from the position detecting means 4 for every predetermined duration (for example, for a predetermined clock cycle, or for a predetermined number of clock cycles), the vibration suppressing speed counting means 1 ignores the first successive n increment signals immediately after an arbitrary decrement signal, then begins to count each increment signal as a +1 unit from the n+1th increment signal after the arbitrary decrement signal, and ignores the first successive n decrement signals immediately after an arbitrary increment signal, then begins to count each decrement signal as a −1 unit from the n+1th decrement signal after the arbitrary increment signal.

Therefore, according to the construction of FIG. 5, vibrations having amplitudes equal to the changes of controlled variable corresponding to n or less of the output signals from the pulse encoder 4 can be suppressed.

INDUSTRIAL APPLICABILITY

A negative feedback control system according to the present invention is, in particular, useful in servo systems for motors.

We claim:

1. A negative feedback control system which comprises: a controlled variable detecting means (4) which detects a predetermined amount of increase and decrease in a controlled variable, and outputs an increment signal or a decrement signal according to the predetermined amount of increase and decrease in the controlled variable, respectively; a simple counting means (5) which counts each increment signal as a +1 unit, and counts each decrement signal as a −1 unit; a vibration suppressing counting means (1) which receives the increment signals and the decrement signals, and which ignores the first successive n increment signals immediately after an arbitrary decrement signal, then begins to count each increment signal as a +1 unit from the n+1th increment signal after the arbitrary decrement signal, and which ignores the first successive n decrement signals immediately after an arbitrary increment signal, then begins to count each decrement signal as a −1 unit from the n+1th decrement signal after the arbitrary increment signal; a controlled variable target value command means (9) which commands the target value of the controlled variable; a first deviation detecting means (6) which detects the deviation of the output of the simple counting means from the target value; a high speed feedback amplifying means (2) which amplifies the output of the vibration suppressing counting means (1) by an amplifying operation at a high response speed and not including an integration; a low speed amplifying means (7) which amplifies the output of the first deviation detecting means (6) by an amplifying operation at a low response speed and including an integration; a second deviation detecting means (8) which detects the deviation of the output of the low speed amplifying means (7) from the output of the high speed feedback amplifying means (2); and a controlled variable varying means (3) which increases or decreases the controlled variable according to the output of the second deviation detecting means (8).

2. A negative feedback control system which comprises: a controlled variable detecting means (4') which detects a predetermined amount of increase and decrease in a controlled variable, and outputs an increment signal or a decrement signal corresponding to the predetermined amount of increase and decrease in the controlled variable, respectively; a speed counting means (51) which receives the increment signals and the decrement signals for every predetermined duration, and counts each increment signal as +1, and counts each decrement signal as −1, for every said predetermined duration; a vibration suppressing speed counting means (1') which counts the increment signals and the decrement signals from the position detecting means (4') for every predetermined duration, and which ignores the first successive n increment signals immediately after an arbitrary decrement signal, then begins to count each increment signal as a +1 unit from the n+1th increment signal after the arbitrary decrement signal, and which ignores the first successive n decrement signals immediately after an arbitrary increment signal, then begins to count each decrement signal as a −1 unit from the n+1th decrement signal after the arbitrary increment signal for said every predetermined duration; a speed command output means (90,91) which commands a target value of a speed of increase or decrease in said controlled variable; a first deviation detecting means (6') which detects a deviation of the output of the speed counting means (51) from said target value of a speed of increase or decrease; a high speed feedback amplifying means (2') which amplifies the output of the vibration suppressing speed counting means (1') by an amplifying operation at a high response speed and not including an integration; a low speed amplifying means (7') which amplifies the output of the first deviation detecting means (6') by an amplifying operation at a low response speed and including an integration; a second deviation detecting means (8') which detects the deviation of the output of the low speed amplifying means (7') from the output of the high speed feedback amplifying means (2'); and a controlled variable varying means (31) which increases or decreases said controlled variable according to the output of the second deviation detecting means (8').

* * * * *